United States Patent
Wik et al.

(10) Patent No.: US 11,277,483 B2
(45) Date of Patent: Mar. 15, 2022

(54) ASSESSING USER ACTIVITY USING DYNAMIC WINDOWED FORECASTING ON HISTORICAL USAGE

(71) Applicant: Microsoft Technology Licensing, LLC, Redmond, WA (US)

(72) Inventors: Jason Wik, Felton, CA (US); Saravana Kumar Chellappan, Santa Clara, CA (US); Eric E. Knutsen, Morgan Hill, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1006 days.

(21) Appl. No.: 15/476,350

(22) Filed: Mar. 31, 2017

(65) Prior Publication Data
US 2018/0287925 A1 Oct. 4, 2018

(51) Int. Cl.
*H04L 29/08* (2006.01)
*H04L 67/50* (2022.01)
(Continued)

(52) U.S. Cl.
CPC ............ *H04L 67/22* (2013.01); *H04L 41/064* (2013.01); *H04L 43/0876* (2013.01); *H04L 41/5012* (2013.01)

(58) Field of Classification Search
CPC ............... H04L 41/064; H04L 41/5012; H04L 43/0876; H04L 67/22
See application file for complete search history.

(56) References Cited

U.S. PATENT DOCUMENTS

| 8,756,699 B1 | 6/2014 | Harren et al. |
| 9,317,812 B2 | 4/2016 | Kabiljo et al. |

(Continued)

FOREIGN PATENT DOCUMENTS

| WO | 2014144893 A1 | 9/2014 |
| WO | 2016109608 A9 | 7/2016 |

OTHER PUBLICATIONS

Geers, Andy, "Reporting How Many People Performed A Particular Event In Google Analytics", http://www.geero.net/2014/03/reporting-how-many-people-performed-a-particular-event-in-google-analytics/, Published on: Mar. 26, 2014, 3 pages.
(Continued)

*Primary Examiner* — June Y Sison
(74) *Attorney, Agent, or Firm* — Michael Best & Friedrich LLP (57) ABSTRACT

Systems and methods for assessing user activity using dynamic windowed forecasting on historical usage. The system includes a server including an electronic processor. The electronic processor is configured to receive, from a network server hosting at least one application for a plurality of users, a data stream including a plurality of historical activity indicators for the plurality of users, the plurality of historical activity indicators including a plurality of unique user identifiers and a plurality of timestamps. The electronic processor is configured to group the plurality of historical activity indicators into a plurality of historical windowed data points based on the plurality of timestamps. The electronic processor is configured to determine a forecasted quantity of users for a forecast time window based on the data points and the plurality of unique user identifiers. The electronic processor is configured to transmit the forecasted quantity of users to a user device.

20 Claims, 5 Drawing Sheets

(51) Int. Cl.
    *H04L 41/0631*     (2022.01)
    *H04L 43/0876*     (2022.01)
    *H04L 41/5009*     (2022.01)

(56) References Cited

U.S. PATENT DOCUMENTS

| | | |
|---|---|---|
| 9,357,022 B1 | 5/2016 | Chou et al. |
| 10,169,711 B1* | 1/2019 | Dean .................. G06N 7/005 |
| 2005/0183143 A1* | 8/2005 | Anderholm ............ G06F 11/32 |
| | | 726/22 |
| 2010/0228850 A1 | 9/2010 | Fomitchev |
| 2010/0295856 A1* | 11/2010 | Ferreira .................. G06T 1/00 |
| | | 345/441 |
| 2014/0095412 A1 | 4/2014 | Agashe et al. |
| 2015/0278061 A1* | 10/2015 | Siciliano ............... H04L 47/762 |
| | | 702/186 |
| 2016/0092774 A1* | 3/2016 | Wang .................... G06F 16/285 |
| | | 706/12 |
| 2016/0307279 A1 | 10/2016 | Liyanage et al. |

OTHER PUBLICATIONS

Steur, Thomas, "How to track Mobile apps usage (clicks, phones, errors, etc.) or track software analytics", http://piwik.org/blog/2012/04/how-to-use-piwik-to-track-mobile-apps-activity-clicks-phones-errors-etc/, Published on: Apr. 9, 2012, 19 pages.

\* cited by examiner

ASSESSING USER ACTIVITY USING DYNAMIC WINDOWED FORECASTING ON HISTORICAL USAGE

FIELD

Embodiments described herein relate to computer system management, and, more particularly, to predicting how many users of a computer system have used, are currently using, or will use the computer system to detect and plan for system outages.

SUMMARY

Network servers, for example, Microsoft Exchange® servers, provide application services to multiple users simultaneously over one or more wired or wireless networks. Such servers are typically designed to provide users with uninterrupted access to the application services on a nearly continuous basis. However, computer systems may experience outages, both planned and unplanned. For example, a server may need to be taken offline for an upgrade or re-configuration. In another example, power or network outages may interrupt users' access to the services. Regardless of the cause of an outage, system administrators may need to understand how many users were or are being affected by the outage. For example, in the event of a planned outage, system administrators may need to be able to predict how many users will be affected by the outage at various points to time to best plan the downtime. In the event of an unplanned outage, hosting providers may need to know how many users were affected to assess the impact of the outage on a customer or to calculate a credit (for example, under a service level agreement). In another example, knowing how many users are expected to be using a system at any time may be used to detect and respond to outages.

To address this concern, volume metrics (measuring the volume of user activities) may be used. However, these methods have proved an unreliable predictor of outage impacts. For example, measuring the volume of user activities is unable to distinguish between one-hundred users performing one task or one user performing the same task one hundred times. User activity is also highly dependent on the time of day, the day of the week, and the region of the world in which the users are located. User activity may also depend on whether a user is a commercial user or a consumer user.

Volume metrics are also unreliable because user activity is inelastic. In particular, when a user has a task to complete, he or she will likely self-correct and continue to attempt to complete the task until he or she is able to. For example, a user who normally sends one email every ten minutes may send the number of emails over the course of an hour (six per hour) whether the email service was fully available or was down for fifty minutes. Accordingly, volume metric looking at emails per hour may fail to detect an outage.

Volume metrics can also mask issues. In particular, an outage affecting a large number of low-use users may be mitigated by one high-use user who does not experience the outage. For example, when nine users who send only two messages a day experience an outage but a single user who sends hundreds of emails a day does not, the outage may not be detected even though 90% of the users were affected.

Thus, embodiments described herein provide, among other things, systems and methods that predict a quantity of unique users performing an action during a particular time window. For example, based on a requested time window for a network server, a subset of windowed data points can be retrieved from a database storing historical activity indicators for the network server. The historical activity indicators indicate which user performed which activities on the application server, and when. The historical indicators are grouped into a time series of windowed data points based on their timestamps and stored in the database. The subset of data points from past instances of the same time window as the requested time window is selected from the database, and, from the subset of historical data points, the quantity of users is predicted.

For example, one embodiment provides a system. The system includes a server communicatively coupled to a database. The server includes an electronic processor. The electronic processor is configured to receive, from a network server hosting at least one application for a plurality of users, a data stream including a plurality of historical activity indicators for the plurality of users, the plurality of historical activity indicators including a plurality of unique user identifiers and a plurality of timestamps. The electronic processor is configured to group the plurality of historical activity indicators into a plurality of historical windowed data points based on the plurality of timestamps. The electronic processor is configured to determine a forecasted quantity of users for a forecast time window based on the plurality of historical windowed data points and the plurality of unique user identifiers. The electronic processor is configured to transmit the forecasted quantity of users to a user device.

Another embodiment provides a method. The method includes receiving, from a network server hosting at least one application for a plurality of users, a first data stream including a plurality of historical activity indicators for the plurality of users, the plurality of historical activity indicators including a plurality of unique historical user identifiers and a plurality of historical timestamps. The method includes grouping the plurality of historical activity indicators into a plurality of historical windowed data points based on the plurality of historical timestamps. The method includes storing to a database the plurality of historical windowed data points. The method includes receiving, from the network server, a second data stream including a plurality of current activity indicators for a current time window, the plurality of current activity indicators including a plurality of unique current user identifiers and a plurality of current timestamps. The method includes grouping the plurality of current activity indicators into a plurality of current windowed data points based on the plurality of current timestamps. The method includes retrieving, from the database, a subset of the plurality of historical windowed data points, the subset representing at least one time series of historical windowed data points corresponding to the current time window. The method includes determining a forecasted quantity of users for the current time window based on the subset of the plurality of historical windowed data points and the plurality of unique historical user identifiers. The method includes determining a current quantity of users for the current time window based on the plurality of current windowed data points and the plurality of unique current user identifiers. The method includes generating an alert when the current quantity of users differs from the quantity of forecast users by more than a predetermined threshold. The method includes transmitting the alert.

Another embodiment provides a non-transitory computer-readable medium including instructions executable by an electronic processor to perform a set of functions. The set of functions includes receiving, from a production server hosting at least one application for a plurality of users, a first data stream including a plurality of historical activity indicators for the plurality of users, the plurality of historical activity indicators including a plurality of unique user identifiers, a plurality of historical user activity identifiers, and a plurality of historical timestamps. The set of functions includes grouping the plurality of historical activity indicators into a plurality of historical windowed data points based on the plurality of historical timestamps. The set of functions includes storing to a database the plurality of historical windowed data points. The set of functions includes receiving, from the network server, a second data stream including a plurality of current activity indicators for a current time window, the plurality of current activity indicators including a plurality of current unique user identifiers, a plurality of current user activity identifiers, and a plurality of current timestamps. The set of functions includes grouping the plurality of current activity indicators into a plurality of current windowed data points based on the plurality of current timestamps. The set of functions includes retrieving, from the database, a subset of the plurality of historical windowed data points representing at least one time series of historical windowed data points corresponding to the current time window. The set of functions includes determining a forecasted quantity of users for the current time window based on the subset of the plurality of historical windowed data points, the plurality of unique user identifiers, and the plurality of historical user activity identifiers. The set of functions includes determining a current quantity of users for the current time window based on the plurality of current windowed data points, the plurality of current unique user identifiers, and the plurality of current user activity identifiers. The set of functions includes generating an alert when the current quantity of users differs from the forecasted quantity of users by more than a predetermined threshold. The set of functions includes transmitting the alert.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, to detect, react to, or plan a system outage, it is important to know how many users were, will be, or are being affected by the outage. However, using volume metrics alone has proved an unreliable predictor. Accordingly, embodiments described herein predict computer system usage for a requested time window using historical activity data for the computer system. The historical activity data is grouped into a time series of windowed data points. Using a subset of the windowed data points from past instances of the same time window as the requested time window, a quantity of users expected to perform an activity during the time window may be determined. As described in more detail below, this prediction can be compared to an actual quantity of users performing the activity to detect whether an outage has occurred, can be used to forecast the impact of an outage of the computer system, can be used to determine an impact of an outage, and the like.

Figure 1:
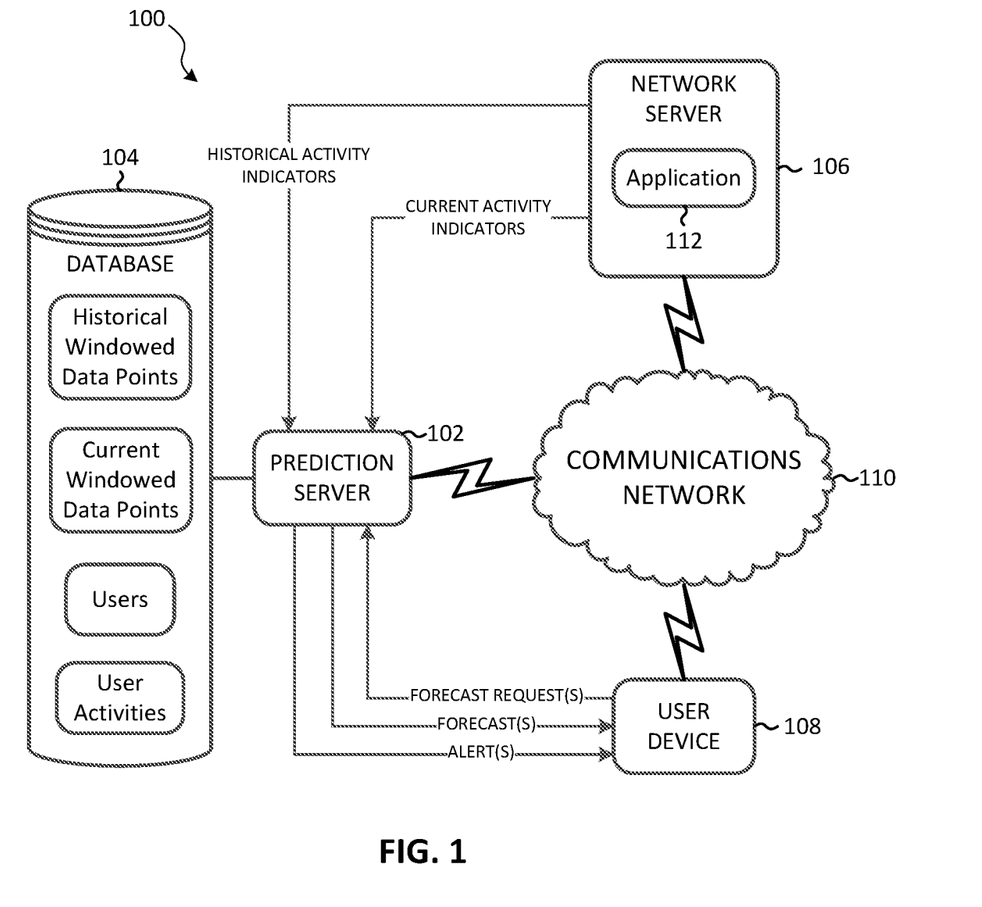
FIG. 1 illustrates a system for predicting computer system usage according to some embodiments.

For example, FIG. 1 schematically illustrates a system 100 for predicting computer system usage. The system 100 includes a prediction server 102, a database 104, a network server 106, and a user device 108. It should be understood that the system 100 is provided as an example and, in some embodiments, the system 100 may include additional components. For example, the system 100 may include multiple prediction servers 102, multiple databases 104, multiple network servers 106, multiple user devices 108, or combinations thereof.

The prediction server 102, the network server 106, and the user device 108 are communicatively coupled via a communications network 110. The communications network 110 may be implemented using a wide area network, such as the Internet, a local area network, such as a Bluetooth™ network or Wi-Fi, a Long Term Evolution (LTE) network, a Global System for Mobile Communications (or Groupe Spécial Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof. As illustrated in FIG. 1, through the communications network 110, the network server 106 transmits historical and current activity indicators to the prediction server 102, and the prediction server 102 exchanges forecast requests and forecasts and associated alerts with the user device 108.

Figure 2:
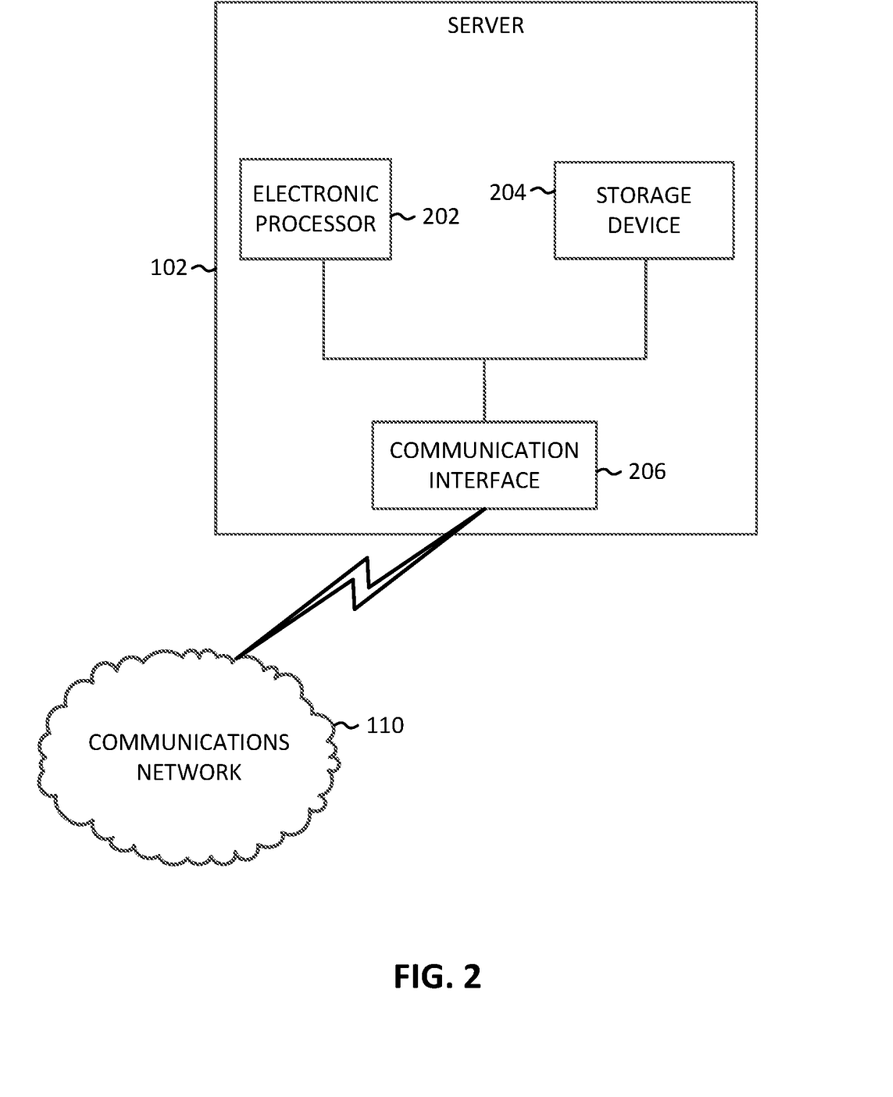
FIG. 2 schematically illustrates a server included in the system of FIG. 1 according to some embodiments.

FIG. 2 schematically illustrates the prediction server 102 in more detail. As illustrated in FIG. 2, the prediction server 102 includes an electronic processor 202 (for example, a microprocessor, application-specific integrated circuit (ASIC), or another suitable electronic device), a storage device 204 (for example, a non-transitory, computer-readable storage medium), and a communication interface 206, such as a transceiver, for communicating over the communications network 110 and, optionally, one or more additional communication networks or connections. It should be understood that the prediction server 102 may include additional components than those illustrated in FIG. 2 in various configurations and may perform additional functionality than the functionality described in the present application. Also, it should be understood that the functionality described herein as being performed by the prediction server 102 may be distributed among multiple devices, such as multiple servers and may be provided through a cloud computing environment, accessible by components off the system 100 via the communications network 110.

The electronic processor 202, the storage device 204, and the communication interface 206 included in the prediction server 102 communicate wirelessly, over one or more communication lines or buses, or combination thereof. The electronic processor 202 is configured to retrieve from the storage device 204 and execute, among other things, software to perform the methods described herein. As described more particularly below, in some embodiments, the prediction server 102 generates forecasts and alerts based on information received from database 104, the network server 106, or both. The prediction server 102 transmits, via the communications network 110, the forecasts and alerts to the user device 108, the network server 106, or to other computing devices (not shown).

As illustrated in FIG. 1, to provide the services described herein, the prediction server 102 may communicate with the database 104. The database 104 may be a database housed on a suitable database server communicatively coupled to and accessible by the prediction server 102. In alternative embodiments, the database 104 is part of a cloud-based database system external to the system 100 and accessible by the prediction server 102 over one or more additional networks. Also, in some embodiments, all or part of the database 104 is locally stored on the prediction server 102 (for example, within the storage device 204).

In some embodiments, as illustrated in FIG. 1, the database 104 electronically stores historical windowed data points, current windowed data points, user data, and user activity data. It should be understood that, in some embodiments, the data stored in the database 104 is distributed among multiple databases that communicate with the prediction server 102. As described more particularly below, the historical windowed data points and current windowed data points are generated by the prediction server 102 from historical activity indicators and current activity indicators received from the network server 106. The user data includes user identifiers, which uniquely identify users of the network server 106. The user activity data includes user activity identifiers, which identify particular activities performed by particular users (for example, identified by user identifiers) of the network server 106.

The network server 106 is a network-attached and accessible computer server that includes similar components as the prediction server 102. The network server 106 executes the application 112, which provides services used by the users of the network server 106. Alternative embodiments execute more than one application 112. The application 112, when executed, provides one or more services, such as a communication or messaging service including but not limited to an email messaging service, an instant messaging service, a calendaring service that manages an electronic calendar, or the like. In some embodiments, users access the application 112 via the communications network 110 using personal computing devices including desktop computers, laptop computers, terminals, tablet computers, smart telephones, wearable devices, or the like.

The user device 108 is a personal computing device that includes similar components as the prediction server 102. In some embodiments, the user device 108 is used to access functionality provided by the prediction server 102 via the communications network 110. The user device 108 may access the functionality provided by the prediction server 102 using a web-browser, a dedicated software client, graphical user interface tools, command-line tools, or the like. As described more particularly below, in some embodiments, the user device 108 generates and transmits, via the communications network 110, forecast requests to the prediction server 102.

Figure 3:
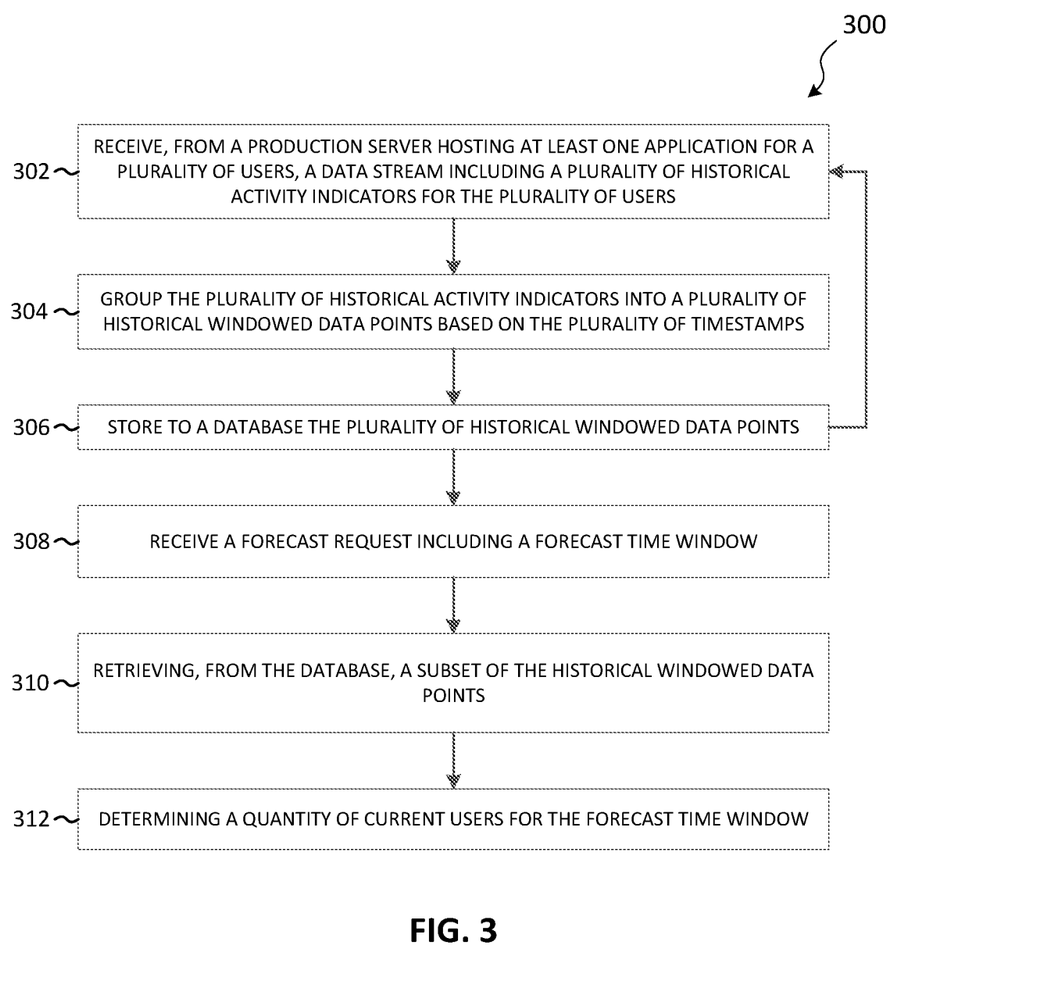
FIG. 3 is a flowchart illustrating a method of predicting computer system usage performed by the system of FIG. 1 according to some embodiments.

FIG. 3 illustrates a method 300 of predicting usage of a computer system, and, in particular, the application 112 executed by the network server 106, according to one embodiment. The method 300 is described as being performed by the prediction server 102 and, in particular, the electronic processor 202. However, it should be understood that in some embodiments, portions of the method 300 may be performed by other devices, including for example, the network server 106, the user device 108, or both.

As illustrated in FIG. 3, at block 302, the electronic processor 202 receives, from the network server 106, a data stream. The data stream includes a plurality of historical activity indicators for a plurality of users of the application 112. The plurality of historical activity indicators includes a plurality of unique user identifiers, a plurality of user activity identifiers, and a plurality of timestamps. A unique user identifier may be a hashed user ID, a username, an email address, or any piece of data that can be used to uniquely identify a user of the application 112. The user activity identifier identifies what activity the user performed. In some embodiments, an activity is any action performed by a user with respect to interacting with the network server 106, the application 112, or data on the network server 112, including transferring data to and from the network server 112. Examples of activities include sending an email, reading an email, querying for new emails, deleting an email or other data, accessing a web page, retrieving or otherwise manipulating a document, creating a calendar entry or invite, and the like. Other examples of activities include logging in or out, accepting calendar invites or meeting requests, canceling meetings or calendar events, copying data, updating contacts, creating folders, deleting folders, changing the name of a folder or document, activating or deactivating a flag, marking message status, performing a search, creating tasks, completing tasks, and the like. The timestamp indicates when a particular user performed a particular activity. In some embodiments, the data stream also includes a server name or other identifier for the network server 106. In some embodiments, the electronic processor 202 stores the raw data stream in the database 104. The electronic processor 202 may also derive additional data (attributes) from the data stream, for example, an application or network protocol, a logical unit of service architecture, and the like, that the electronic processor 202 may similarly store in the database 104.

The electronic processor 202 also groups the plurality of historical activity indicators into a plurality of historical windowed data points based on the plurality of timestamps (at block 304). In some embodiments, the electronic processor 202 arranges the historical activity indicators into a sequential time series based on the timestamps and aggregates the historical activity indicators into data bins of a determined size (that is, a length of time). For example, using one-minute data bins, the historical activity indicators timestamped during a particular minute may be aggregated (binned) into a historical windowed data point for that minute. In some embodiments, a historical windowed data point is a one-minute data bin that includes a count of each of the activities that each user performed during an individual minute. In some embodiments, the bin (or window) size for the historical windowed data points varies depending on the desired level of data granularity. After generating the historical windowed data points, the electronic processor 202 stores the plurality of historical windowed data points to the database (at block 306).

Predictive analysis improves with the amount of historical data available. Accordingly, in some embodiments, the electronic processor 202 may repeatedly receive and process historical activity indicators from the network server 106. This store of historical data may be used to predict (future, current, or past) usage of the application 112. For example, in some embodiments, the electronic processor 202 receives a forecast request from the user device 108 (at block 308). In some embodiments, the forecast request is automatically generated (for example, by an automated system monitoring tool). The forecast request may also be the result of a user input. However generated, the forecast request includes a forecast time window. In some embodiments, the forecast time window corresponds to time during which an outage was known or suspected to have occurred. The forecast time window may also correspond to a possible time for a planned outage. For example, when several users report that they experienced an outage between 9:00 AM to 10:00 AM on Wednesday, the time window may be set accordingly.

In response to receiving the forecast request (at block 308), the electronic processor 202 retrieves, from the database 104, a subset of the historical windowed data points (at block 310). The subset represents at least one time series of historical windowed data points corresponding to the forecast time window. For example, when the time window is from 9:00 AM to 10:00 AM on a Wednesday, the subset includes all of the windowed data points for one or more past Wednesdays from 9:00 AM to 10:00 AM. Accordingly, the subset of historical windowed data points includes, for each minute of the time window, a count of activities each user performed during one or more past instances of that minute.

In some embodiments, a historical windowed data point includes a count of unique users performing a particular activity or a plurality of activities (for example, a particular sequence or combination of activities). In the example noted above, the windowed data points are the result of aggregating the historical activity indicators into one-minute data bins. In some embodiments, the forecast request includes a granularity level (that is, a data bin size) for the historical activity indicators. For example, a forecast request may include a granularity level of five minutes, in which case the electronic processor 202 will re-aggregate the historical activity indicators to produce historical windowed data points using five-minute data bins.

Optionally, in some embodiments, the electronic processor 202 assigns a weight to one or more of the historical windowed data points. In some embodiments, the weight is used to indicate how "normal" a data point is in relation to the time window being forecast. For example, when the forecast time window occurs during ordinary operations (operations not associated with an outage), and a data point was recorded during a past confirmed outage, the data point may be weighted with a lower value than data points collected during ordinary operations. In another example, when the forecast time window occurs during a work day, and a data point was recorded on a date when the time window fell on a holiday, that data point may be weighted with a lower value than data points collected during work days. Likewise, if the forecast time window occurs during a holiday, data points from past holidays may be weighted higher. In some embodiments, the electronic processor 202 assigns the weights to generate a plurality of weighted historical windowed data points. In such embodiments, the subset described above includes at least one time series of weighted historical windowed data points corresponding to the forecast time window.

The electronic processor 202 determines a quantity of users for the forecast time window based on the subset of the historical windowed data points and the plurality of unique user identifiers (at block 312). In some embodiments, the electronic processor 202 takes each windowed point of the requested forecast time series and determines a distribution for the corresponding historical windowed data points. Using the example noted above, the electronic processor would determine a distribution for each minute of the hour between 9:00 AM and 10:00 AM. In embodiments incorporating weighted data points, the distributions are updated to take the weighting into account. In some embodiments, the electronic processor 202 produces, for each minute of the forecast window, a high value (for example, the 99th percentile), a low value (for example, the 1st percentile), and a mean value. From these three values, the electronic processor 202 generates a time series forecasting the quantity of users during the forecast time window.

As noted above, this predicted or forecasted quantity of users may be used in various ways. For example, in one embodiment, the forecasted quantity can be compared to an actual quantity of users to detect outages. For example, the electronic processor 202 may receive a second data stream that includes a plurality of current activity indicators for a current time window. The plurality of current activity indicators includes a plurality of current unique user identifiers, a plurality of current user activity identifiers, and a plurality of current timestamps. The second data stream is similar to the data stream including historical activity indicators but represents current (near real-time) data on the user activities of the network server 106 (the application 112). The current time window may be any length time window (for example, 1 minute, 5 minutes, 30 minutes) and may be an immediate past window (for example, the last 5 minutes). In some embodiments, the current time window is determined on a rolling basis (for example, the current time window is always the immediate past 5 minutes). As described above with respect to the historical activity indicators, the electronic processor 202 groups the plurality of current activity indicators into a plurality of current windowed data points based on the plurality of current timestamps.

Similar to how the forecasted quantity of users is determined, the electronic processor 202 determines a quantity of current users for the current time window based on the plurality of current windowed data points and the plurality of unique user identifiers. The electronic processor 202 then compares this current quantity to a forecasted quantity generated as described above. By comparing the forecasted quantity of users to the current quantity of users, the electronic processor 202 can determine whether an outage is occurring during the current time window. In some embodiments, when the difference between the forecast and current users exceeds a predetermined threshold, the electronic processor 202 generates an alert, which may be logged or transmitted, such as to the user device 108 or the network server 106. In one example, the predetermined threshold is an absolute threshold (for example, a ten percent variance). In another example, the predetermined threshold is a relative value indicative of a variance from the difference determined for recent current time windows, or a median or average difference for previously-generated current time windows. The alert may be an email, a text message, a Simple Network Management Protocol (SNMP) alert, or the like. In some embodiments, the alert includes data identifying the network server 106 and the type of outage occurring.

Figure 4:
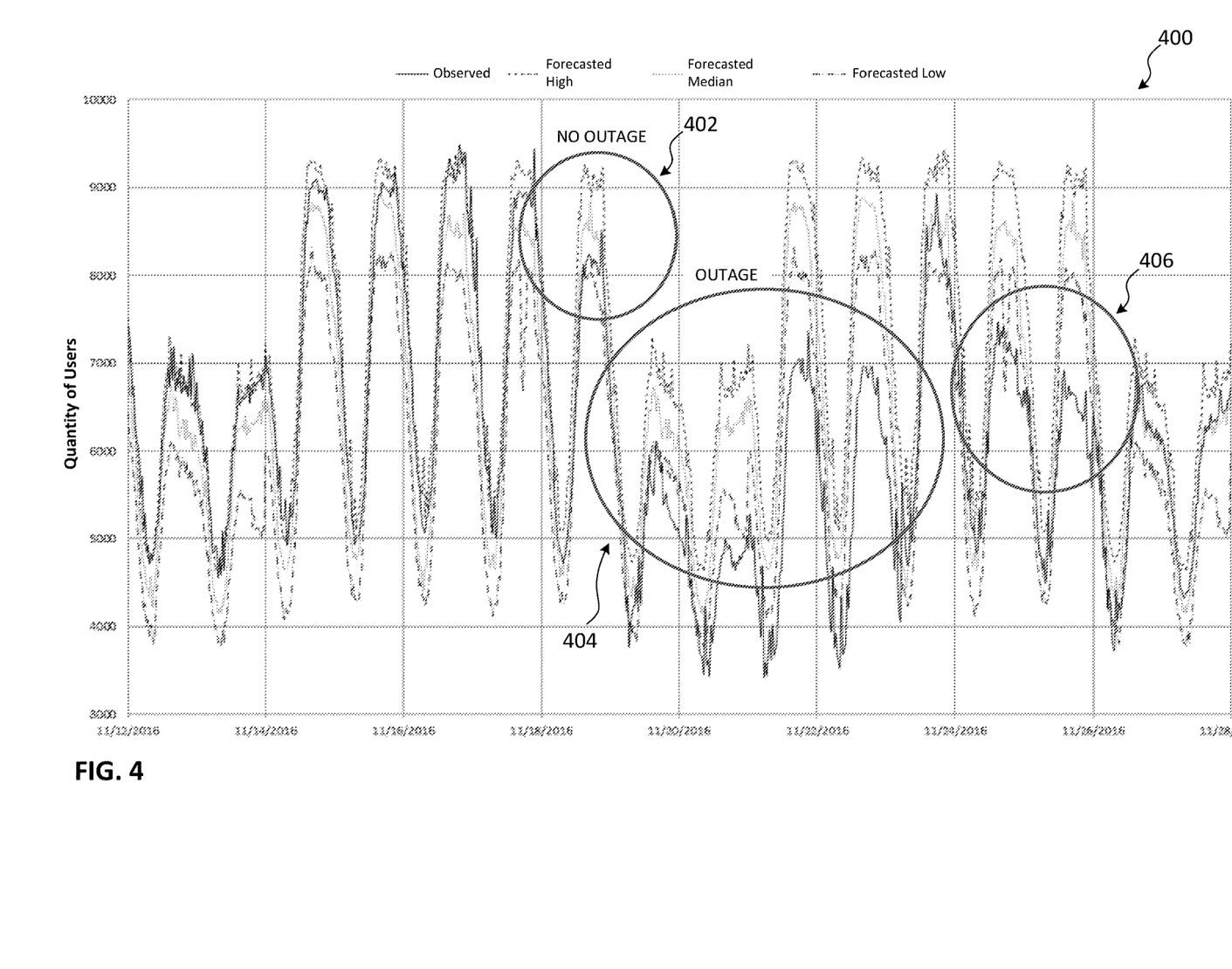
FIG. 4 is a chart illustrating a time series for a data set according to some embodiments.

For example, chart 400 illustrated in FIG. 4 compares an actual observed quantity of users to a forecasted mean quantity of users, a forecasted high quantity of users, and a forecasted low quantity of users produced using the method 300. Area 402 of the chart 400 highlights a time window where the actual quantity of users falls between the high and low forecasted quantities of users, implying that no outage occurred during this time window. In contrast, the area 404 of the chart 400 highlights a time window where the actual quantity of users repeatedly falls below the forecasted low quantity of users and, at no point in time, does the actual quantity of users meet or exceed the forecasted mean quantity of users. Accordingly, an outage likely occurred during the time window highlighted in area 404. Similarly, the area 406 of the chart 400 highlights a time window occurring during a holiday where the actual quantity of users falls generally between the forecasted quantity but an outage may not have occurred (the low quantities of users are associated with the holiday and not an outage). Accordingly, area 406 illustrates an instance where weighting of the windowed data points may result in more reliable forecast data. Furthermore, in some embodiments, various exponential smoothing methods, such as a dual Holt-Winters exponential smooth method, can be used to adjust forecasted quantities based on seasonal behaviors.

In some embodiments, the electronic processor 202 determines the forecasted quantity of users for the forecast time window further based on the plurality of user activity identifiers. For example, it may be desirable to predict how many users performing one or more particular activities are affected by an outage. For example, a system administrator may wish to take down one service for an upgrade but leave the other services operational. Forecasting quantities of users for the particular service, therefore, may reveal the best time to schedule the upgrade. As another example, when complaints are received regarding the accessibility of a particular feature available through the application 112, the prediction server 102 may forecast quantities for that particular feature and not the application 112 in general. In these situations, the prediction server 102 may generate the historical windowed data points to include only those data points that correspond to the activity of interest.

Also, in some embodiments, the electronic processor 202 determines the forecasted quantity of users for the forecast time window based on a pivot attribute, which may be included in the forecast request. Pivot attributes may include a region, a client, a protocol, a user type, a customer account (for example, an enterprise customer account), a logical service infrastructure, or the like. For example, the forecast may be summarized by geographical regions or user type (web users, Internet Message Access Protocol (IMAP) users, Post Office Protocol (POP) users, or the like).

Figure 5:
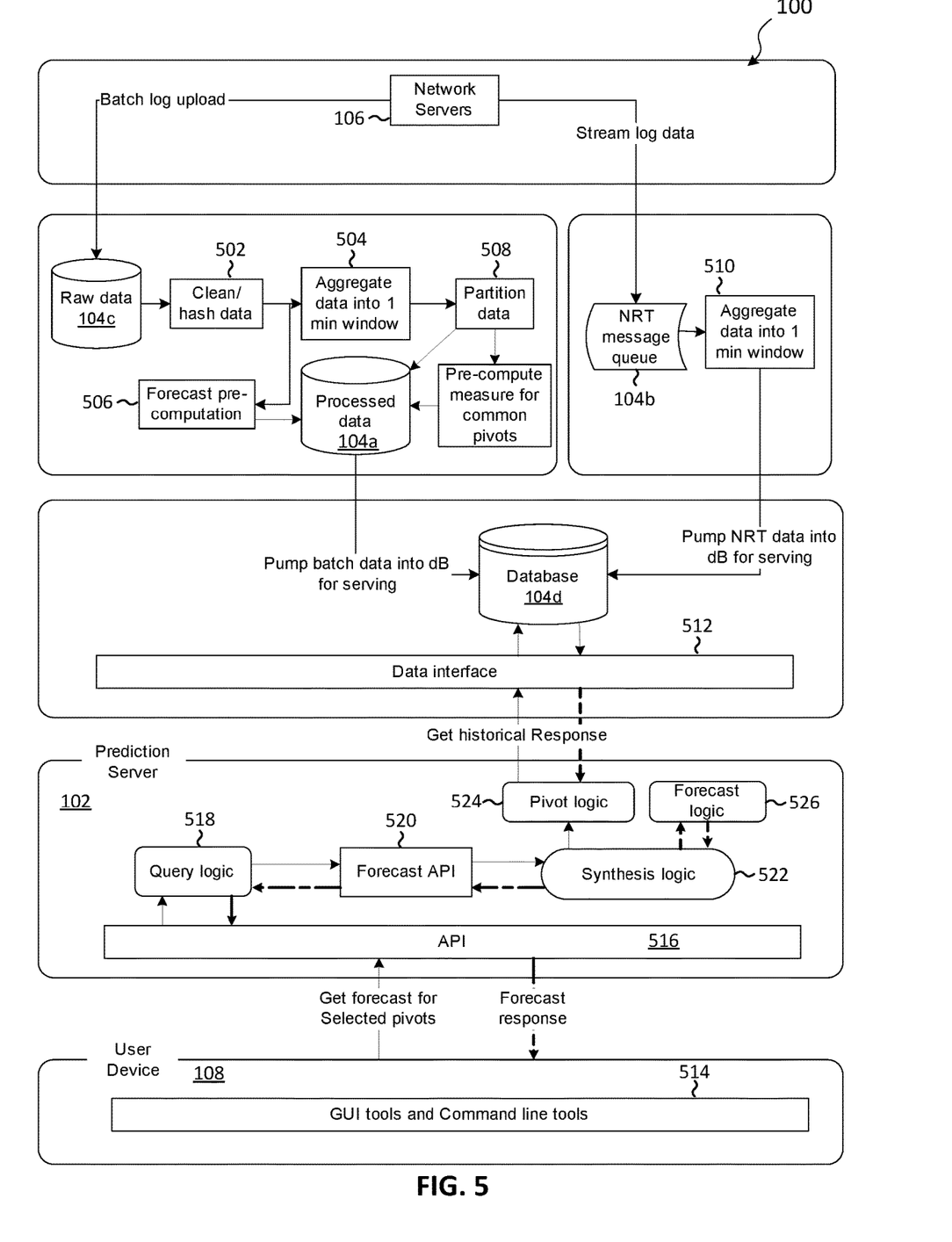
FIG. 5 illustrates an alternative embodiment of the system of FIG. 1.

FIG. 5 illustrates one implementation of the system 100 according to some embodiments. As illustrated in FIG. 5, activity indicators associated with one or more network servers 106 is generated. In one embodiment, the historical activity indicators may be transmitted from the network servers 106 to a database 104a as part of a batch log upload, and the current activity indicators may be transmitted from the network servers 106 to a separate storage device, such as a near real time (NRT) message queue 104b as part of streamed log data.

As illustrated in FIG. 5, the historical activity indicators stored in the database 104a is pre-processed (at 502) (cleaned, hashed, and the like as needed) and aggregated into time windows as described above (at 504). Forecasted values may also be pre-computed based on the aggregated data (at 506) and stored in the same database 104a storing the processed data or a separate database 104d. Also, in some embodiments, the aggregated data is partitioned and used to pre-compute forecasts for common pivots, such as common regions, user types, and the like (at 508). This pre-computations may also be stored in the same database 104a storing the processed data or the separate database 104c for processed data. Similarly, the current activity indicators are aggregated as described above (at 510). As noted above, in some embodiments, the prediction server 102 performs this processing of activity indicators. However, in other embodiments, this processing may be performed in a distributed fashion using multiple devices. For example, one or more intermediary devices may process activity indicators to prepare data subsequently used by the prediction server 102 as described above.

As illustrated in FIG. 5, the processed historical data and the processed current data may be stored to a database 104d, which is associated with a data interface 512. The prediction server 102 may use the data interface 512 to obtain data from for generating forecasted quantity of users, comparing such quantities to current quantities, and the like. For example, a user operating the user device 108 may use an interface 514 (graphical user interface tool, command line tools, and the like) to initiate a forecast request. As described above, the prediction server 102 receives the forecast request (through an application programming interface (API) 516) and uses query logic 518, a forecast API 520, and synthesis logic 522 to obtain data from the database 104d to respond to the forecast request as described above. As illustrated in FIG. 5, the synthesis logic may use both pivot logic 524 and forecast logic 526 to generate a response to the forecast request, which the prediction server 102 provides to user device 108 submitting the request. It should be understood that the implementation illustrated in FIG. 5 represents one example implementation and other architectures and configurations may be used to predict usage of a computer system as described above.

Various features and advantages of some embodiments are set forth in the following claims.

What is claimed is:

1. A system comprising:
a server communicatively coupled to a database, the server including an electronic processor configured to
receive, from a network server hosting at least one application for a plurality of users, a data stream including a plurality of historical activity indicators for the plurality of users, the plurality of historical activity indicators including a plurality of unique user identifiers and a plurality of timestamps;
arrange the historical activity indicators into a sequential time series based on the plurality of timestamps;
group the plurality of historical activity indicators into data bins of a determined size to generate a plurality of historical windowed data points based on the plurality of timestamps;
determine a forecasted quantity of users for a forecast time window based on the plurality of historical windowed data points and the plurality of unique user identifiers; and
transmit, to a user device, the forecasted quantity of users.

2. The system of claim 1, wherein the electronic processor is further configured to
store the plurality of historical windowed data points to the database; and
retrieve, from the database, a subset of the plurality of historical windowed data points, the subset representing at least one time series of the plurality of historical windowed data points corresponding to the forecast time window;
wherein the forecasted quantity of users is determined based on the subset of the plurality of historical windowed data points and the plurality of unique user identifiers.

3. The system of claim 2, wherein the electronic processor is further configured to assign a weight to each of the plurality of historical windowed data points to generate a plurality of weighted historical windowed data points and wherein the electronic processor is configured to retrieve the subset of the plurality of historical windowed data points based on the plurality of weighted historical windowed data points.

4. The system of claim 1, wherein the electronic processor is further configured to receive a forecast request including the forecast time window.

5. The system of claim 4, wherein
the forecast request further includes an activity;
the plurality of historical activity indicators includes a plurality of user activity identifiers; and
the electronic processor is configured to determine the forecasted quantity of users for the forecast time window further based on the plurality of user activity identifiers corresponding to the activity.

6. The system of claim 4, wherein the forecast request includes a pivot attribute and wherein the electronic processor is configured to determine the forecasted quantity of users for the forecast time window based on the pivot attribute.

7. The system of claim 6, wherein the pivot attribute is one selected from a group consisting of a region, a client, a protocol, a user type, a customer account, and a logical service infrastructure.

8. The system of claim 1, wherein each of the plurality of user activity identifiers represents one selected from a group consisting of sending an email, reading an email, querying for new emails, deleting an email, accessing a web page, retrieving a document, and creating a calendar invite.

9. The system of claim 1, wherein the electronic processor is further configured to
receive, from the network server, a second data stream including a plurality of current activity indicators for a current time window, the plurality of current activity indicators including a plurality of current unique user identifiers, a plurality of current user activity identifiers, and a plurality of current timestamps;
group the plurality of current activity indicators into a plurality of current windowed data points based on the plurality of current timestamps;
retrieve, from the database, a subset of the plurality of historical windowed data points, the subset representing at least one time series of historical windowed data points corresponding to the current time window;
determine a forecasted quantity of users for the current time window based on the subset of the plurality of historical windowed data points and the plurality of unique user identifiers;
determine a current quantity users for the current time window based on the plurality of current windowed data points and the plurality of unique user identifiers;
generate an alert when the current quantity users differs from the forecasted quantity of users by more than a predetermined threshold; and
transmit the alert.

10. A method comprising:
receiving, from a network server hosting at least one application for a plurality of users, a first data stream including a plurality of historical activity indicators for the plurality of users, the plurality of historical activity indicators including a plurality of unique historical user identifiers and a plurality of historical timestamps;
arranging the historical activity indicators into a sequential time series based on the plurality of timestamps;
grouping the plurality of historical activity indicators into data bins of a determined size to generate a plurality of historical windowed data points based on the plurality of historical timestamps;
storing to a database the plurality of historical windowed data points;
receiving, from the network server, a second data stream including a plurality of current activity indicators for a current time window, the plurality of current activity indicators including a plurality of unique current user identifiers and a plurality of current timestamps;
grouping the plurality of current activity indicators into a plurality of current windowed data points based on the plurality of current timestamps;
retrieving, from the database, a subset of the plurality of historical windowed data points, the subset representing at least one time series of historical windowed data points corresponding to the current time window;
determining a forecasted quantity of users for the current time window based on the subset of the plurality of historical windowed data points and the plurality of unique historical user identifiers;

determining a current quantity of users for the current time window based on the plurality of current windowed data points and the plurality of unique current user identifiers;

generating an alert when the current quantity of users differs from the quantity of forecast users by more than a predetermined threshold; and transmitting the alert.

11. The method of claim 10, wherein the plurality of historical activity indicators includes a plurality of historical user activity identifiers;

the plurality of current activity indicators includes a plurality of current user activity identifiers;

determining a forecasted quantity of users for the current time window includes determining the forecasted quantity of users for the current time window based on the plurality of historical user activity identifiers; and determining a current quantity of users for the current time window includes determining the current quantity of users based on the plurality of current user activity identifiers.

12. The method of claim 11, wherein each of the plurality of historical user activity identifiers and each of the plurality of current user activity identifiers represents one selected from a group consisting of sending an email, reading an email, querying for new emails, deleting an email, accessing a web page, retrieving a document, and creating a calendar invite.

13. The method of claim 10, further comprising assigning a weight to each of the plurality of historical windowed data points to generate a plurality of weighted historical windowed data points, wherein retrieving the subset of the plurality of historical windowed data points includes retrieving the subset of the plurality of historical windowed data points based on the plurality of weighted historical windowed data points.

14. The method of claim 10, wherein determining the forecasted quantity of users includes determining the forecasted quantity of users based on a pivot attribute and wherein determining the current quantity of users includes determining the current quantity of users based the pivot attribute.

15. The method of claim 14, wherein determining the current quantity of users based the pivot attribute includes determining the current quantity of users based on one selected from a group consisting of a region, a client, a protocol, a user type, a customer account, and a logical service infrastructure.

16. A non-transitory computer-readable medium including instructions executable by an electronic processor to perform a set of functions, the set of functions comprising:

receiving, from a production server hosting at least one application for a plurality of users, a first data stream including a plurality of historical activity indicators for the plurality of users, the plurality of historical activity indicators including a plurality of unique user identifiers, a plurality of historical user activity identifiers, and a plurality of historical timestamps;

arranging the historical activity indicators into a sequential time series based on the plurality of timestamps;

grouping the plurality of historical activity indicators into data bins of a determined size to generate a plurality of historical windowed data points based on the plurality of historical timestamps;

storing to a database the plurality of historical windowed data points;

receiving, from the network server, a second data stream including a plurality of current activity indicators for a current time window, the plurality of current activity indicators including a plurality of current unique user identifiers, a plurality of current user activity identifiers, and a plurality of current timestamps;

grouping the plurality of current activity indicators into a plurality of current windowed data points based on the plurality of current timestamps;

retrieving, from the database, a subset of the plurality of historical windowed data points representing at least one time series of historical windowed data points corresponding to the current time window;

determining a forecasted quantity of users for the current time window based on the subset of the plurality of historical windowed data points, the plurality of unique user identifiers, and the plurality of historical user activity identifiers;

determining a current quantity of users for the current time window based on the plurality of current windowed data points, the plurality of current unique user identifiers, and the plurality of current user activity identifiers;

generating an alert when the current quantity of users differs from the forecasted quantity of users by more than a predetermined threshold; and transmitting the alert.

17. The non-transitory computer-readable medium of claim 16, wherein each of the plurality of historical user activity identifiers and each of the plurality of current user activity identifiers represents one selected from a group consisting of sending an email, reading an email, querying for new emails, deleting an email, accessing a web page, retrieving a document, and creating a calendar invite.

18. The non-transitory computer-readable medium of claim 16, wherein the set of functions further comprises assigning a weight to each of the plurality of historical windowed data points to generate a plurality of weighted historical windowed data points and wherein retrieving the subset of the plurality of historical windowed data points includes retrieving the subset of the plurality of historical windowed data points based on the plurality of weighted historical windowed data points.

19. The non-transitory computer-readable medium of claim 16, wherein determining the forecasted quantity of users includes determining the forecasted quantity of users based on a pivot attribute and wherein determining the current quantity of users includes determining the forecasted quantity of current users based the pivot attribute.

20. The non-transitory computer-readable medium of claim 19, wherein determining the forecasted quantity of users based the pivot attribute includes determining the forecasted quantity of users based on one selected from a group consisting of a region, a client, a protocol, a user type, a customer account, and a logical service infrastructure.

* * * * *